No. 699,062. Patented Apr. 29, 1902.
J. H. BAIN.
BARBED WIRE FENCE.
(Application filed Dec. 31, 1901.)
(No Model.)
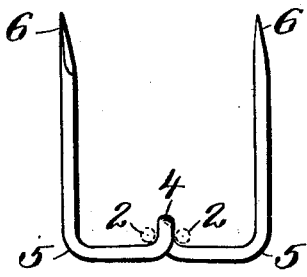
Fig. 1.
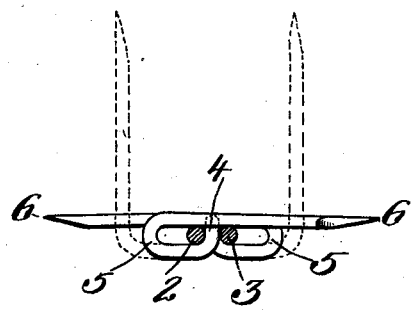
Fig. 2.
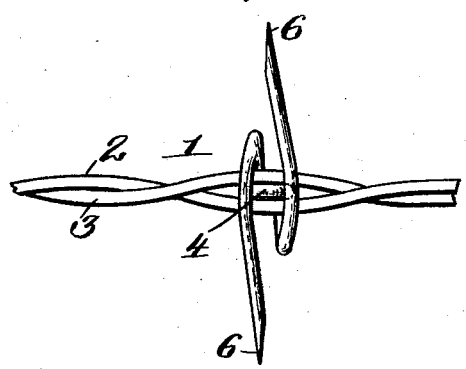
Fig. 3.
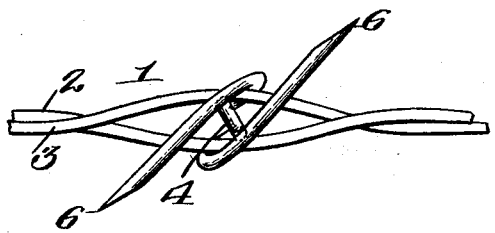
Fig. 4.
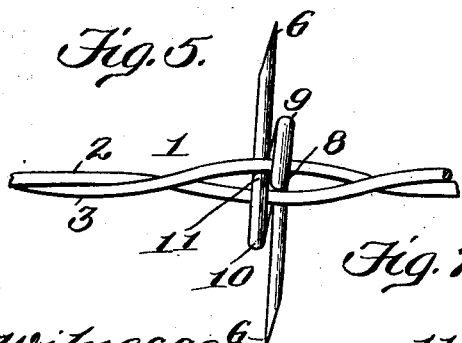
Fig. 5.
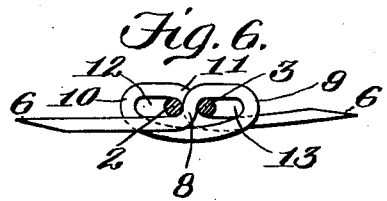
Fig. 6.
Fig. 7.
Witnesses
Inventor
John H. Bain
By James L. Norris
Atty.
THE NORRIS PETERS CO., PHOTO-LITHO., WASHINGTON, D. C.

UNITED STATES PATENT OFFICE.

JOHN H. BAIN, OF MARION, OHIO.

BARBED-WIRE FENCE.

SPECIFICATION forming part of Letters Patent No. 699,062, dated April 29, 1902.

Application filed December 31, 1901. Serial No. 87,908. (No model.)

*To all whom it may concern:*

Be it known that I, JOHN H. BAIN, a citizen of the United States, residing at Marion, in the county of Marion and State of Ohio, have invented new and useful Improvements in Barbed-Wire Fences, of which the following is a specification.

This invention relates to barbed-wire fences, and especially to that class of such fences wherein the barbs are movably arranged on the fence-wires which support them in such a manner that they will yield when cattle and other live stock come in contact with the fence, and thus prevent lacerating, puncturing, and otherwise injuring the animals.

My invention has for its object to provide in a fence of the character referred to improved barbs so constructed and supported on the fence-wires that they will oscillate in the plane of the barbed ends when an animal strikes them, so that they will not prick or cut or tear the animal's skin, and after they have been disengaged will be automatically restored to their normal position—that is to say, to such a position that the barbed ends of the barbs will project, substantially, at right angles to the fence-wires.

To these ends my invention consists in the features and in the construction and arrangement of parts hereinafter described, and particularly pointed out in the claims following the description, reference being had to the accompanying drawings, forming a part of this specification, wherein—

Figure 1 is a view of a blank from which one form of my improved barb is made and before the barb has been applied to the wire. Fig. 2 is a view of the barb after it has been applied to the fence-wires, the dotted lines illustrating the manner of binding the ends of the barb to attach it to the fence-wires, which latter are shown in cross-section. Fig. 3 is a top plan view showing the barb applied to the fence-wires; and Fig. 4 is a view similar to Fig. 3, but showing the position the barb assumes when it yields upon being struck by an animal. Fig. 5 is a top plan view showing another form of barb applied to the fence-wires. Fig. 6 is a view in side elevation of the barb, the fence-wires being shown in cross-section; and Fig. 7 is a view similar to Fig. 5, showing the position the barb assumes when it yields upon being struck by an animal.

Before proceeding to a detailed description of my improved fence I will state that both forms of the barb illustrated embody the same principle of operation and that in each of the forms illustrated the barbs will readily yield when struck by an animal, so that they will not lacerate, tear, or cut the skin of an animal, and when they are disengaged or released they will be automatically restored to their original or normal position.

Referring to Figs. 1 to 4 of the drawings, the numeral 1 indicates one of the fence-wires consisting of two strands of wire 2 and 3, which are twisted together spirally in the usual manner and form a wire cable. In practice the barbs are first made in the form of blanks having the shape shown in Fig. 1, each of said blanks comprising a piece of wire of a suitable length, which is first bent intermediate its ends to form a U-shaped portion 4 having the general shape of a staple the legs of which are arranged parallel to one another and in the same vertical plane. The two portions of the wire are then bent at right angles to the plane of the staple or U-shaped portion of the blank and in opposite directions, and each of them is again bent at a point 5 at a right angle and in planes parallel with the plane of the central U-shaped portion or staple 4. The extremities of the two ends of the blank are preferably pointed, as at 6. The blanks thus formed are in readiness to be attached to the wire cable. To attach the barb to the fence the U-shaped portion or staple 4 is inserted between the two strands 2 and 3 of the wire cable at a point where said strands form a loop or eye, the U-shaped portion being disposed between said strands in such manner that the legs of said U-shaped portion lie in a plane substantially parallel with the longitudinal axes of the strands 2 and 3, as most clearly shown in Fig. 3 of the drawings. The two ends of the blank are then bent over both of said strands in opposite directions, their pointed ends projecting horizontally beyond the opposite sides of the wire cable, as shown. The points 5 at which the members of the blank are bent at right angles are arranged at such a distance from the U-shaped portion or staple 4 that when the free ends of the blank are bent over the strands in the manner described they form elongated loops 7, which loosely engage the strands, whereby the barbs may be freely oscillated in the horizontal plane on the wire cable without binding upon the strands. The twisted strands of the wire cable engage the opposite flat sides of the staples or U-shaped portions 4 of the barb with a yielding pressure, whereby the barbs are held at a right angle to the wire cable, as shown in Fig. 3. When an animal runs against either of the pointed ends of one of the barbs, however, the pressure exerted upon said barb then will oscillate or turn the barb at an angle to the cable, as shown in Fig. 4, whereby the barb will harmlessly scrape against the skin of the animal and be prevented from lacerating or tearing the same. In order to assume the normal position shown in Fig. 4, however, the flat U-shaped portion or staple 4 will operate in manner similar to a cam to force the two strands of the wire cable 1 slightly apart, so that the moment the pressure on the barb is released the two strands of the cable will operate as springs to turn said U-shaped portion or staple to its former position and will thus turn the barb so that its pointed ends will again lie at right angles to the cable. It will be noticed by referring to Fig. 4 of the drawings that when the barbs yield the U-shaped portion or staple 4 will under no circumstances assume a right angle to the cable, and hence said barbs will at all times be returned or restored to their normal positions with certainty.

In Figs. 5, 6, and 7 I have shown a slightly-modified manner of constructing the barb, but still retaining the same principle of operation. In constructing the barb shown in said figures I take a piece of wire of suitable length and preferably pointed at its opposite ends and insert one end portion thereof between the two strands 2 and 3, forming the cable 1. One of the free ends of said wire is bent horizontally under one of the strands, as 2, at right angles to the vertical portion 8 of said wire which lies between the said strands. The other portion of the wire is then bent horizontally over the other strand 3 and is then bent at a point 9 downwardly and reversely under both of the strands 2 and 3, is next bent at a point 10 inward toward the cable and over the strand 2 and thence vertically down between the said strands, as at 11, parallel to the vertical portion 8 and 4 referred to, and is finally bent under the strand 3 horizontally and at a right angle to the vertical portion 11. The barb thus formed comprises two elongated loops 12 and 13, which loosely engage the respective strands of the cable and may be freely oscillated thereon without binding on the same. Moreover, the two vertical portions 8 and 11 of the barb as they lie parallel to one another and in the same vertical plane constitute a species of cam similar to the U-shaped portion or staple 4 of the barb. (Shown in Figs. 1 to 4 and hereinbefore described.) When an animal runs against either of the pointed ends of one of the barbs thus constructed, the barb is oscillated and turned to an angle to the cable, so that it will inflict no injury upon the animal, as before described. The moment, however, the pressure upon the barb is released the two strands 2 and 3 of the cable, owing to their pressure against the vertical portions 8 and 11 of the barb, will immediately force said portions into parallelism with the strands and will thus restore the barb to its original position and hold it at an approximately right angle to the staple.

In both the forms shown the barb is attached to both strands of the wire cable by elongated loops which permit of the free oscillation of the barbs upon the cable and in both forms. Also a species of cam is provided which operates to hold the barb at substantially a right angle to the cable and also operates to restore the barb to such position after it has been swung to one side by an animal in the manner described. In both forms of the device, also, the barb will exert a sufficient scratching action upon the skin of the animal to produce irritation and induce the animal to refrain from attempting to break through the fence.

Having described my invention, what I claim is—

1. The combination with two fence-wires spirally twisted together, of a barb movably attached to said wires and comprising a single piece of wire bent to form two elongated loops which loosely encircle the respective wires whereby said barb is free to oscillate on said wires, the free ends of the barb being bent in opposite directions, substantially as described.

2. The combination with two fence-wires spirally twisted together, of a barb movably attached to said wires and comprising a single piece of wire bent to form two elongated loops which loosely encircle the respective wires whereby said barb is free to oscillate on said wires, said barb-wire being bent to form two parallel members that project between the two fence-wires, the plane in which said parallel members lie being parallel with the longitudinal axes of the fence-wires, substantially as and for the purpose specified.

3. The combination with two fence-wires spirally twisted together, of a barb movably attached to said wires and comprising a single piece of wire extending between its ends across both the fence-wires and bent to form two elongated loops which loosely encircle the respective wires, the free end of the wire forming each loop passing between the two fence-wires and thence bent at a right angle away from its loop and past the adjacent loop, substantially as described.

4. The combination with two fence-wires spirally twisted together, of a barb movably attached to said wires and comprising a single piece of wire extending between its ends across both the fence-wires and bent to form two elongated loops which loosely encircle the respective wires, the free ends of the wire forming each of said loops being passed between the two fence-wires in opposite directions, the free end of each loop being extended past and parallel with the adjacent loop, substantially as described.

In testimony whereof I have hereunto set my hand in presence of two subscribing witnesses.

JOHN H. BAIN.

Witnesses:
GEORGE S. BAIN,
D. R. CRISSINGEN.